Oct. 22, 1963 B. M. GORDON ETAL 3,108,266

SIGNAL CONVERSION APPARATUS

Original Filed July 22, 1955 3 Sheets-Sheet 1

INVENTORS
BERNARD M. GORDON
ROBERT P. TALAMBIRAS
BY Joseph Weingarten
ATTORNEY

INVENTORS
BERNARD M. GORDON
ROBERT P. TALAMBIRAS
BY Joseph Weingarten
ATTORNEY

INVENTORS
BERNARD M. GORDON
ROBERT P. TALAMBIRAS
BY
Joseph Weingarten
ATTORNEY

United States Patent Office
3,108,266
Patented Oct. 22, 1963

3,108,266
SIGNAL CONVERSION APPARATUS
Bernard M. Gordon, Newton, and Robert P. Talambiras, Auburndale, Mass., assignors to Epsco, Incorporated, Cambridge, Mass., a corporation of Massachusetts
Original application July 22, 1955, Ser. No. 523,798. Divided and this application Jan. 5, 1960, Ser. No. 609
2 Claims. (Cl. 340—347)

This application is a division of our pending application, Serial No. 523,798, filed July 22, 1955, now Pat. No. 2,989,741 entitled Information Translating Apparatus and Method.

This invention relates in general to an information translating system of the type which converts analog information to digitally coded information by a method of successive approximations and more particularly pertains to a digital-to-analog converter forming part of that system, that converter having substantial uses in other arrangements as well as independent utility.

With the development of high speed digital and analog computing systems, the need has arisen for high speed devices to convert information from analog-to-digital form and reversely from digital form to analog form. Such converting devices make it feasible to employ in one computing system apparatus which operates upon information in diverse forms by changing the information to a form acceptable to the mechanism to which the information is applied. This permits a digital computing mechanism, for example, to be linked to an analog computing mechanism to form a complex and versatile computing system. In order to preserve the high speed capabilities of modern computer systems, the converting devices must be able to rapidly and continually convert the information presented to it.

The principal object of this invention is to provide a digital-to-analog converter able to rapidly and continuously convert the digital information presented to it into an analog voltage.

The invention resides in a digital-to-analog converter having a flip-flop stage for each bit in the digital code to be converted to an analog voltage. The current flowing in each flip-flop stage is held at a constant value by a current regulating device. Each flip-flop stage is held in one of its two stable conditions when its binary bit is a "zero" and is placed in its other condition when its binary bit is a "one." The signal determining whether the flip-flop stage is placed in its "zero" condition or its "one" condition is derived from a corresponding bit stage of a reversible binary counter. When the flip-flop stage is in its "zero" condition, the current flowing in that stage has no effect upon the output analog voltage. However, where the flip-flop stage is in its "one" condition, the current is caused to flow in a resistive network from which the output analog voltage is taken and hence that current affects the output. The resistive network is arranged so that the current flowing into it from a flip-flop stage which has a binary significant position greater than the least significant position produces an effect upon the output voltage which is twice the effect caused by the next preceding flip-flop stage which is of lesser binary significance. The resistive network is provided with a variable resistor for adjusting the value of the output analog voltage without affecting the interrelationship of the various flip-flop stages.

The arrangement and mode of operation of the invention can be more fully understood by a perusal of the following detailed description when considered in conjunction with the drawings, in which.

In the annexed drawings, like parts are identified by like reference characters and values of potential are given only for the purposes of illustation and not to limit the scope of the invention.

Figure 1:
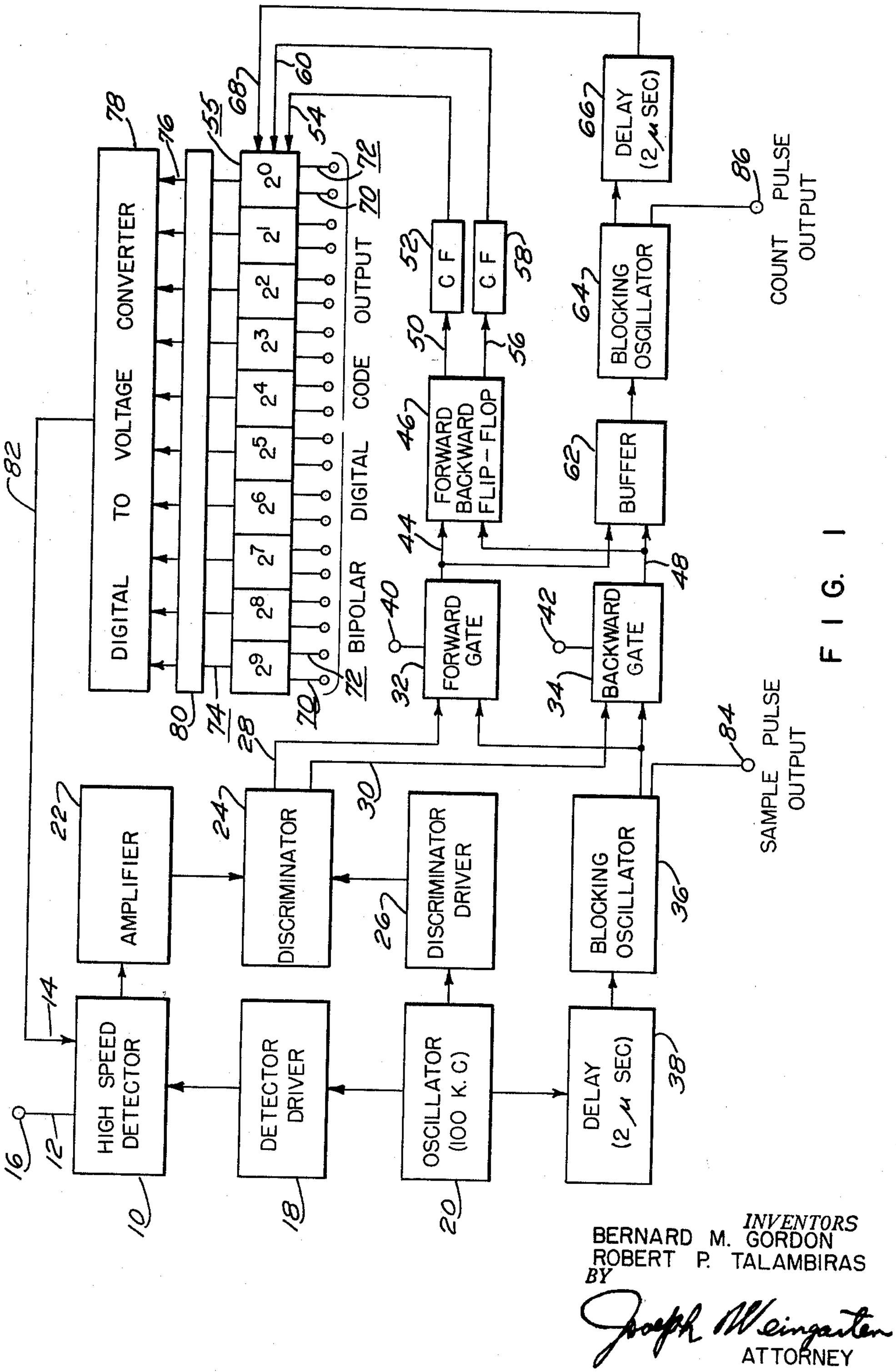
FIGURE 1 is a block diagram illustrating an information translating apparatus embodying the invention.

Referring to FIG. 1 which illustrates the information storing apparatus in block form, a high speed detector 10 is provided with first and second information input leads 12 and 14. The input lead 12 of detector 10 is adapted to receive information in analog form from a terminal 16. The externally derived information may be continuously varying and may have the form of a voltage signal. The external signal may, however, also have other aspects including current and impedance forms.

The signals delivered to the signal input terminal 14 of the detector 10 are derived internally and are also in analog form. The signals delivered to terminal 14 may also have voltage, current, or impedance aspects.

The high speed detector 10 is periodically energized by a detector driver 18 which is excited by an oscillator 20 which may have a frequency of 100 kilocycles.

When the high speed detector 10 is energized, it produces an output signal corresponding to the relationship of the signals delivered respectively to the input leads 12 and 14. This output signal is delivered through an amplifier 22 to a discriminator 24. The discriminator 24 is energized by a discriminator driver 26 which is also stimulated by the oscillator 20.

The discriminator 24 delivers a control signal over its first output line 28 when the signal from amplifier 22 is above a predetermined value, and delivers a control signal over its second output line 30 when this signal is below the predetermined value.

The output line 28 delivers its signal to the first input terminal of a forward gate 32, while the other output line 30 of the discriminator 24 delivers its signal to the first input terminal of a backward gate 34.

The second input terminals of the forward and backward gates 32, 34, are energized by the output signal from a blocking oscillator 36. The blocking oscillator 36 is stimulated by the oscillator 20 through a delay element 38. By this means the blocking oscillator 36 is effect delivers a timing signal to the forward and backward gates 32 and 34.

The forward and backward gates 32 and 34 are each provided with a control terminal 40, 42 for respectively conditioning the delivery of signals therethrough.

Assuming that permissive signals are delivered to the control terminals 40, 42, the concurrence of signals at both input terminals of the forward gate allows the delivery of a signal to the output line 44, while the concurrence of input signals to the backward gate 34 results in the delivery of an output signal over the line 48.

A forward backward flip-flop 46 has its first and second input terminals respectively energized by the output lines 44 and 48. When the output line 44 is energized, the flip-flop 46 assumes a state delivering a signal over its output line 50 through a cathode follower 52 to the forward control line 54 of a storage or reversible binary counting device 55. When a signal is delivered to the flip-flop 46 by the line 48, it assumes its other stable state, delivering an output signal to its line 56. This signal is delivered through a cathode follower 58 to the backward control line 60 of the counter 55.

The signals appearing on the gate output lines 44 and 48 are delivered through a buffer 62 to the input of a blocking oscillator 64. If the signal delivered to the blocking oscillator 64 is greater than a predetermined minimum threshold value, it delivers an output signal through a delay element 66 to the input count line 68 of the counting device 55. The delay element 66 assures sufficient time for the counting device 55 to assume its forward or backward state before the count signal is delivered to it.

The binary counting device 55 is of the reversible type controlled by the input lines 54, 60 and increases or decreases its stored count when an input signal is delivered to its input line 68 in accordance with the control signals received. The count information stored in the counting device 55 is available in bipolar digital code over the respective sets of output leads 70 and 72.

The information output signal of the binary counting device 55 is also delivered over a plurality of output lines 74 to a corresponding series of input leads 76 of a digital-to-voltage converter 78 by a connecting plug 80. The digital-to-voltage converter 78 produces at its output lead 82, a signal which has an amplitude related to the count of the binary counting device 55. The amplitude signal on line 82 is delivered to the second input line 14 of the high speed detector 10. Thus the information stored in digital form by the counting device 55 is converted to a corresponding analog form and is delivered to the high speed detector 10 for comparison with the external analog signal received by its input line 12.

*Operation*

The information translating apparatus is also provided with a sample pulse output terminal 84 and a count pulse output terminal 86 delivering signals which may be useful in operating and coordinating other related and auxiliary equipment.

In the operation of the information translating apparatus, the high speed detector 10 compares the external analog signal received over its first input line 12 with the internally derived analog signal delivered over the second input line 14. When the detector 10 is periodically energized by the detector driver 18, it delivers an output signal to the amplifier. This signal is determined by the relationship of the compared signals. When the external and internally derived signals are in a predetermined balanced relationship, the detector 10 does not deliver a signal to the amplifier 22. When the signal over line 14 under balances the external signal received on line 12 of the high speed detector 10, the detector 10 delivers an output signal to the discriminator 24 through the amplifier 22 characterized by this underbalanced relationship. If the signal on line 14 overbalances the signal of line 12 of the detector 10, the detector delivers an output signal to the discriminator 24 which is characterized by the overbalanced relationship.

Upon receipt of a signal indicating underbalance, the discriminator 24 when energized by the discriminator driver 26, produces an output signal on its line 28 and when it receives a signal indicating overbalance the discriminator 24 produces an output signal on its line 30 upon energization by the driver 26.

The output lines 28 and 30 of the discriminator 24 respectively energize the first input terminals of the forward and the backward gates 32 and 34. Thus, under conditions of underbalance, the forward gate 32 delivers an output signal to its line 44 when it receives a timing signal from the blocking oscillator, while under conditions of overbalance the backward gate 34 delivers an output signal over its output line 48.

The delivery of an output signal to the flip-flop 46 from the forward gate 32 sets it in its forward state energizing its output line 50 which in turn delivers a signal to the binary counting device 55 over the forward control line 54. This sets the binary counting device 55 for counting in the forward direction. On the other hand, the delivering of an output signal from the backward gate 34 sets the flip-flop 46 to its backward state which results in the energization of its output lead 56. The signal from the output lead 56 energizes the backward control line 60 which conditions the binary counting device 55 for counting in the reverse or backward direction.

Output signals from either the forward gate 32 or the backward gate 34 energize the blocking oscillator 64 through the buffer 62. In order to stimulate the blocking oscillator 64 the amplitude of the signal delivered thereto must be sufficient to represent an unbalance of at least one count or possibly a predetermined fraction thereof for the purpose of adding stability to the apparatus. If the unbalance is sufficient for correction, the blocking oscillator passes a signal through a delay element 66 to the forward count line 68 of the binary counting device 55. The delay element provides a sufficient time delay for the counting device 55 to assume its required forward or backward counting state.

Thus, under conditions of underbalance, the counting device 55 is set to its forward direction and if the underbalance is sufficient a signal is delivered to the counting device 55 to increase its count by one unit count. The increased count of the binary counting device 55 causes the converter 78 to deliver a corresponding output signal to the input line 14 of the high speed detector 10 which tends to balance the external input signal 12. In this way, the count of the counting device 55 increases by one unit count each time the detector 10 is energized until the underbalance of the analog signal on the input terminal 14 is reduced to a state of balance with respect to the external signal received over the input terminal 16.

The apparatus operates in a similar manner when the signal delivered from the converter 78 to the high speed detector 10 overbalances the external signal received at terminal 16. In this case the signal periodically delivered by the detector 10 to the discriminator 24 energizes the backward gate which sets the flip-flop 46 to its backward state. This results in the counting device 55 reducing its count by one unit count each time a signal is delivered from the blocking oscillator 64. The reduced count of the binary counting device 55 is reflected in the output signal of the converter 78 which changes its value in the direction to balance the externally received signal. The process of reducing the count of the counting device 55 takes place each time the detector 10 is energized by the detector driver 18 until the overbalance condition is replaced by the balanced state.

By comparing the signal derived from the converter 78 with an external analog signal which may be continuously varying, the binary counter may have its count periodically increased or decreased to correspond with the received signal. The binary counting device 55 thereby provides at its output terminals 70, 72 and 74 a digital code which is a translation of the analog information received at the input terminal 16. This digital code information is constantly available so that it can be taken at random times without synchronization and is periodically corrected at a high rate (100,000 times per second) to correspond with the input analog signal.

The information translating apparatus take advantage of the last translated information stored in the binary counting device 55 by changing its count to account only for changes in the information being translated. The efficiency and accuracy of operation of the apparatus is accomplished by this method since it is only necessary to change the count of the counting device 55 by increasing or decreasing it to correspond with the newly received information. If the received information is continuously varying then the change in the count will correspond to the change in the received analog information, rather than a change from zero value to the translation value. It is evident that the counting device 55 is accurately corrected and follows any change in the incoming signal which does not exceed the rate of one count for each periodic sampling of the incoming signal. It is noted that the illustrated apparatus uses a sampling or comparing frequency of 100 kilocycles. Of course, this period may be adjusted for the particular requirements of the apparatus being designed. The number of significant digits of the binary counter 55 may be increased, thereby increasing the accuracy of the translated information, by adding stages to the counting device 55. The number of significant places translated, the sampling or comparing frequency, and the rate at which the device can follow and accurately translate the incoming analog signals are all related and affect one another in the design of the equipment.

The apparatus may be used for determining the maximum or minimum values attained by a constantly varying analog signal which is delivered to the input terminal 16, in the following manner. To determine the maximum value attained by the varying analog signal, a permissive signal is delivered only to the control terminal 40 of the forward gate 32. The backward gate 34 is thus inhibited, and the forward gate will pass signals allowing the binary counting device 55 to increase its count when the output signal from the converter underbalances the externally derived signal on terminal 16. Since the count of the counting device 55 cannot be reduced, it will be shown in digital form the greatest value attained by the varying signal over a given period of time. Of course, the digital counter 55 should be initially set at zero value or at a value below the peak attained by the varying signal.

In a similar manner, for the determination of the lowest or minimum value attained over a given period of time by the varying signal delivered to the input terminal 16, a permissive signal is delivered only to the control terminal of the backward gate 34, while the forward gate 32 is inhibited by the lack of such a signal. In this case, only the backward gate 34 passes signals from the discriminator 24 causing the counting device 55 to indicate the lowest value attained by the varying signal. This is so since the counting device 55 cannot receive signals for counting in the forward direction. The count of the binary counting device 55 must be initially set at a value greater than the minimum value which is attained by the varying external signal for proper operation.

The information translating apparatus has been demonstrated thus far for converting analog information received at its input terminal 16 to digitally coded information delivered at the 1 output lines 70, 72, 74 of the counting device 55. By removing the connecting plug 80, the apparatus may now, conversely, receive digitally coded information over the series of input leads 76 of the converter 78 and delivers an analog signal corresponding therewith over its output line 82. This conversion is achieved by utilizing the converter 78 already present in the apparatus and without the use of additional equipment. The apparatus thus provides in one unit, means for converting varying analog information to digital form, and is adjustable for converting varying external digital information to corresponding analog form. This feature increases the versatility and usefulness of the apparatus.

*Reversible Binary Counter*

Figure 2:
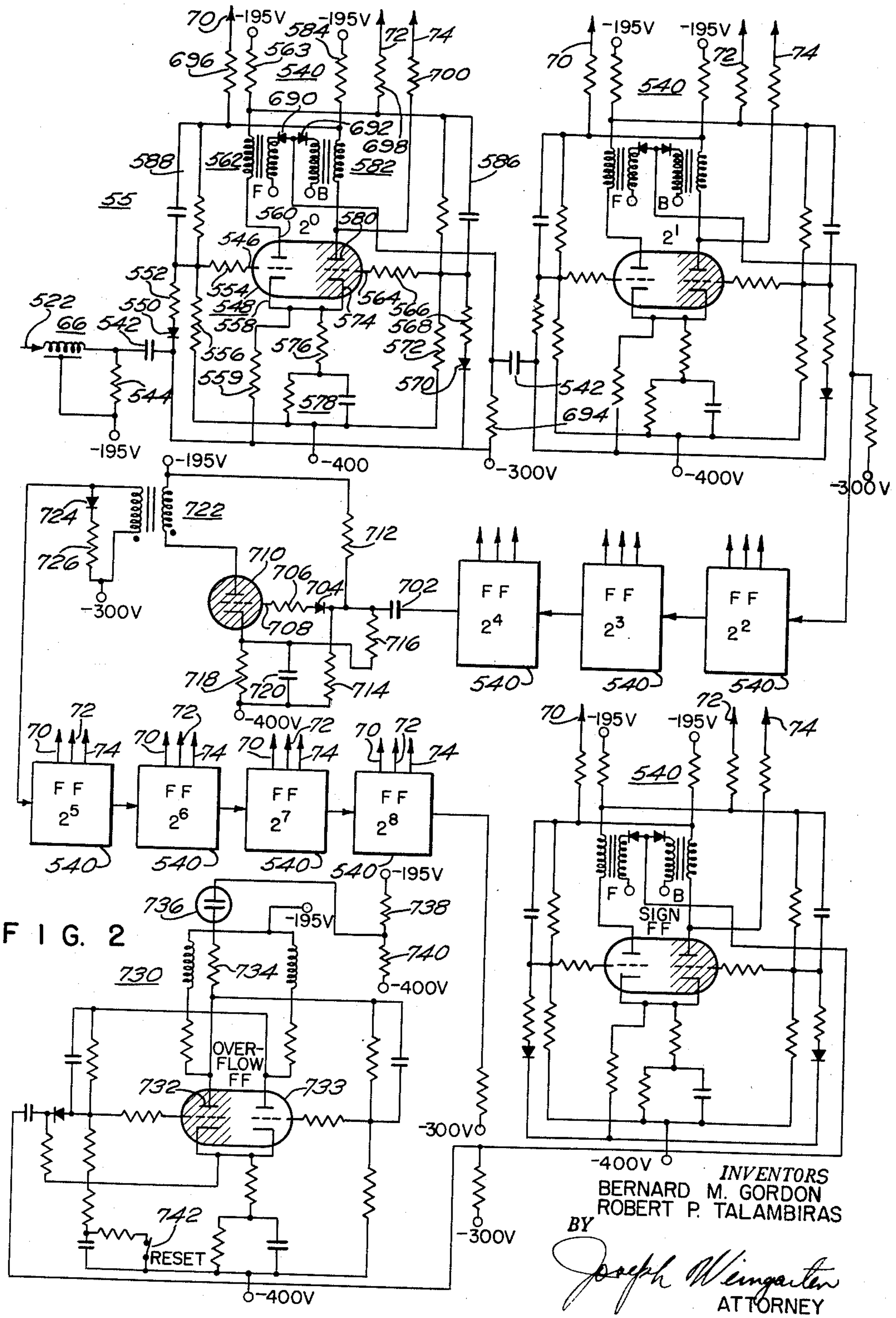
FIGURE 2 illustrates in schematic and block form the reversible counting device illustrated in FIG. 1.
Figure 3:
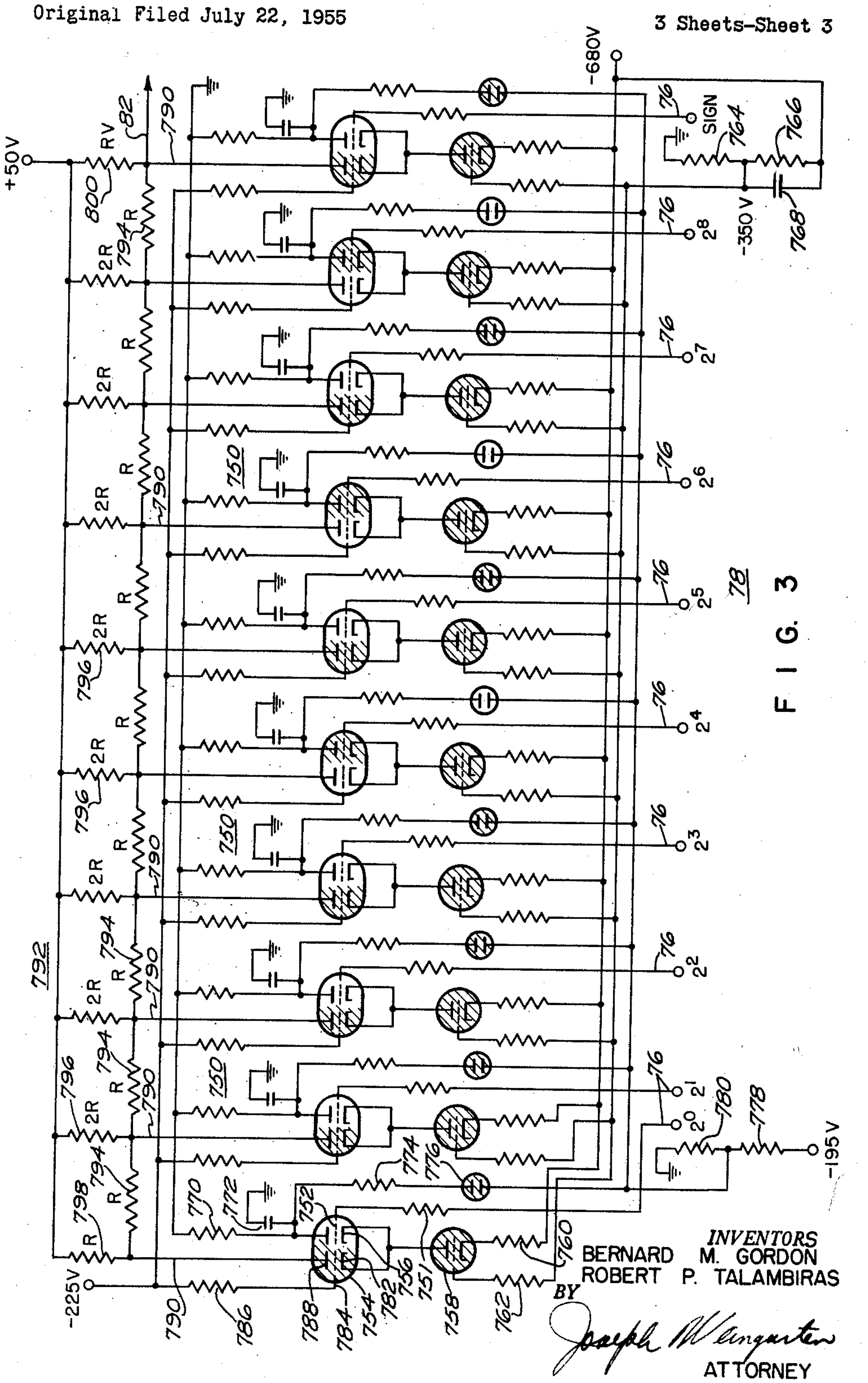
FIGURE 3 is a schematic illustration of the digital-to-voltage converter represented in FIG. 1 by block 78.

The reversible binary counter represented by block 55 in FIG. 1 is schematically depicted in detail in FIG. 2. As indicated in FIG. 1, signals are transmitted from cathode follower 52 over the forward control line 54 to the input of the reversible binary counter 55. The signals on forward control line 54 are actually delivered to the terminals F of the ten cascade bistable or flip-flop circuits 540 shown in FIG. 2 which form the reversible binary counter 55. The signals on backward control line 60 (FIG. 1) are applied to the terminals B (FIG. 2) of the ten cascade bistable circuits.

The negative-going signals from the blocking oscillator 64 are delivered over the line 522 to the input capacitor 542 of the first bistable circuit 540 through the inductor-capacitor delay element 66 which has a terminating resistor 544 returned to a negative potential of 195 volts.

The coupling capacitor 542 delivers the signals to the control element 546 of the double section tube 548 through a diode 550 in series with resistors 552 and 554. The diode 550 is poled to transmit negative signals to the tube 548. The control electrode 546 is also returned to a negative potential of 500 volts through the grid resistor 554 in series with a resistor 556. The cathode 558 is joined with a negative potential of 400 volts by a cathode resistor 559, while the anode 560 is linked with a negative potential of 195 volts through the primary winding of a pulse transformer 562 and a load resistor 563.

The tube 548 which has one of its sections conductive while its other section is non-conductive, receives excitation at its control electrode 564 from the coupling capacitor 542 through a grid resistor 566 in series with a resistor 568 and a diode 570 poled for passing negative signals. The control electrode 564 is also returned to a negative potential of 400 volts by the grid resistor 566 in series with a resistor 572, while its cathode 574 is joined to the negative potential of 400 volts by a cathode resistor 576 in series with a parallel resistor-capacitor combination 578. The anode 580 of tube 548 is returned to a negative potential of 195 volts by the primary winding of a pulse transformer 582 and a series load resistor 584. The control electrode 564 of tube 548 is also cross-coupled by the grid resistor 566 and the parallel resistor-capacitor combination 586 with the junction of the primary winding of the transformer 562 and the load resistor 563 in the circuit of anode 560, while the control electrode 546 is cross-coupled by the grid resistor 554 and the parallel resistor-capacitor combination 588 with the junction of the primary winding of the transformer 582 and the load resistor 584 in the circuit of the anode 580.

The secondary winding of the transformer 562 has one end connected to the terminal F for receiving control signals from the forward control line 54 and its other end connected to the cathode of a diode 690 which has its anode returned to a negative potential of 300 volts through an output resistor 694 and is coupled to the following bistable circuit 540 by its input capacitor 542.

The secondary winding of transformer 582 has one end connected to the terminal B for receiving control signals from the backward control line 60 and its other end connected to the cathode of a diode 692 which has its anode joined to the anode of the diode 690.

The cascade bistable or flip-flop circuits 540 each represents a significant position in a binary coded number, the preceding bistable circuits 540 having a lesser significance than the succeeding circuits 540. Thus, the first bistable circuit 540 which receives the input count signal may be represented by $2^0$, while the following bistable or flip-flop circuit 540 is represented by $2^1$, the third by $2^2$ and so forth. Each of the bistable circuits 540 is identical to any other circuit 540 in construction and operation. The description of the construction and operation of one unit 540 therefore, may be considered to apply to the remaining units 540.

The digital code output line 70 derives its excitation by connecting in the anode circuit of the tube 548 at the junction between the primary winding of the transformer 582 and load resistor 584, while the output line 72 is connected to the junction between the primary winding of transformer 562 and load resistor 563. Since these leads are connected to the respective anodes of tube 548, only one of which is conducting, bipolar signals are respectively derived. Signals are delivered to the converter exciting line 74 by connection with the anode 580 of the tube 548.

As illustrated in the drawing when the right section of the tube 548 is conductive, the output signals delivered to the line 70, 72, and 74 represent the "one" state of the bistable circuit 540, whereas when the left side of the tube 548 conducts, the signals derived represent the "zero" state of the circuit. When a negative signal is delivered through the input capacitor 542 of the bistable or flip-flop circuit 540, conduction is transferred from the conducting side of the tube to the non-conducting portion. Thus, if the circuit 540 is initially set in its "zero" state, it is actuated to its "one" state, whereas if it is in its "one" state it is returned to its "zero" state.

The initiation of conduction when the circuit is changed from one state to another produces a negative-going pulse in the secondary winding of the transformer associated with the anode which becomes conductive. For the purposes of illustration, assume that the forward-backward flip-flop 46 is in its forward state so that a forward control line 54 delivers a negative voltage of 300 volts to the F terminal, while the backward control line 60 delivers a signal more positive than this to the B terminal of the circuit 540. Thus, when the tube 548 assumes its "zero" state, a negative signal is produced and delivered through the capacitor 542 to the succeeding flip-flop circuit 540. When the circuit 540 is actuated to its "one" state, excitation of its transformer 582 produces a negative signal in its secondary winding which however, is positively biased and therefore does not transmit a signal through the coupling capacitor to the succeeding binary stage or bistable circuit 540. This selective biasing of the secondary windings of the transformers 562 and 582 causes the binary counting circuit 55 to count in the forward direction. When the bias voltages applied to the terminals F and B of the circuit 540 are reversed, as when the forward-backward flip-flop circuit 46 is in its backward state, a carry pulse to the succeeding stage will be transmitted only when the valve 548 assumes its "one" state of conduction. This results in a binary counting circuit which subtracts from the stored value by one count for each input signal received.

It is therefore noted that by selecting the forward and backward control signals, the counting device 55 is fully reversible and may be made to count in the backward and forward directions.

The delay element 66 which produces a delay of 2 microseconds is provided to allow sufficient time for the bistable circuits 540 to receive the proper biasing signals at their terminals F and B for the selected forward or backward counting action. It is noted that this switching however may be accomplished at a very high rate.

The cascade bistable circuits 540 of the counting device 55 may have interposed after the fifth bistable circuit as illustrated in FIG. 4, a pulse amplifying and shaping network which receives signals through a coupling capacitor 702. The coupling capacitor 702 passes negative signals through a diode 704 which is series connected with a grid resistor 706 that is joined with the control electrode 709 of a normally conducting amplifier tube 710. The cathode of the diode 704 which is joined to the capacitor 702 is returned to the negative potential of 195 volts by a resistor 712 and is connected with a negative potential source of 400 volts by a resistor 714. The cathode of diode 704 is also joined by a resistor 716 with the cathode of tube 710. The cathode of tube 710 is returned to a negative potential of 400 volts through a cathode resistor 718 which is by-passed by a capacitor 720. The anode of tube 710 is returned to the negative potential of 195 volts through the primary winding of a transformer 722.

The secondary winding of the transformer 722 has one end returned to a negative potential of 300 volts while its other end delivers a signal to the sixth cascade bistable circuit 540. The ends of the secondary winding of the transformer 722 are also bridged by a diode 724 and a load resistor 726 for quick recovery from positive pulse signals.

In operation, a negative signal is delivered to the control electrode of the normally conducting tube 710 causing it to become non-conducting. This produces a negative-going signal at the output winding of the transformer 722 which is of proper amplitude for effectively triggering the succeeding ($2^5$) flip-flop circuit 540.

The tenth in the series of flip-flop circuits 540 may be utilized to indicate the sign of the count of the counting device 55 when it is to include negative numbers as well as positive numbers. In such a case, the tenth circuit indicates that the number of the count is negative when it is in the "zero" state, while producing a positive number when it is in its "one" state.

The flip-flop circuit 730 which follows the tenth flip-flop circuit 540, is similar thereto except that it is not provided with pulse transformers in its anode circuits, and has its anode 732 joined by a resistor 734 to a neon bulb 736 which connects with the junction between resistors 738 and 740 bridging the negative potentials of 195 volts and 400 volts. The tube 733 of flip-flop 730 normally has its left section conductive so that its anode 732 is maintained at a reduced voltage preventing conduction of the neon bulb 736.

When a negative-going signal is received from the preceding bistable circuit 540 indicating an overflow condition, conduction is switched so that the anode 732 becomes more positive and allows the neon bulb 736 to conduct for indicating the overflow condition.

The flip-flop tube 733 may be reset by opening the switch 742 which delivers a positive signal to the control electrode associated with the anode 732 causing it to become conductive and in condition for again indicating an overflow condition.

*Digital-to-Voltage Converter Circuit*

Refer now to the FIG. 5 for a description of the digital-to-voltage converter 78.

The connecting plug 80 shown in FIGURE 1 may be used to join the converter output leads 74 of the cascade bistable stages 540 of the counting device 55 with the series of respective input leads 76 of the converter 78. Each of the input leads 76 connects with an identical current control network 750 which corresponds with the several flip-flop circuits 540 of differing digital significance. The description of one of the networks 750, therefore, will apply to the other nine current control networks 750.

The signal input lead 76 is connected by a grid resistor 751 to the control element 752 of a two section switching tube 754. The cathode 756 of tube 754 is linked to the anode of a normally conducting current control tube 758 which has its cathode returned by a cathode resistor 760 to a negative potential of 680 volts. The control electrode of tube 758 is connected through a grid resistor 762 to a negative potential of 350 volts developed at the junction of a pair of divider resistors 764 and 766 bridged between ground potential and the negative potential of 680 volts. The divider resistor 766 is by-passed by a capacitor 768.

The anode associated with the control electrode 752 of the current switching tube 754 is returned by a load resistor 770 to the ground potential level and is by-passed by a capacitor 772. This anode is also joined by a resistor 774 with a neon bulb 776 which has its other side connected to the junction of a pair of voltage dividing resistors 778 and 780 bridging a negative potential of 195 volts and ground potential.

The cathode of the second section of tube 754 is also connected to the anode of the normally conducting current control tube 758, while its control electrode 784 is returned to a negative potential of 225 volts by a grid resistor 786. The anode 788 associated with the cathode 782 of the tube 754 is joined with the signal input line 790 of a signal converting network 792.

The signal converting network 792 comprises a series of signal input lines 790 each connected with the anode 788 of a respective one of the tubes 754 of the current control networks 750. A plurality of series connected resistors 794 of resistance R are respectively connected between adjacent input signal lines 790, while their junctions are respectively returned to a positive potential of 50 volts by a plurality of parallel resistor 786 having a resistance of 2R. The end of the signal converting network 792 associated with the current control network 750 of the least significant position is connected to a positive potential of 50 volts by a resistor 798 having a resistance of R while the other end of the network is returned to the positive potential of 50 volts by a terminal or output resistor 800. The terminal or output resistor 800 has a resistance of $R_V$ which may be varied to equal or exceed R.

The resistors 794 should be quality controlled to have almost identical R values, while the resistors 796 should have substantially identical 2R values.

The junction of series resistor 794 and terminal resistor 800 is connected to the converter output signal line 82.

*Converter Operation*

In the operation of converter 78, the current switching tube 754 of the current control network 750 has one of its sections conductive, while its other section is non-conductive. Thus, when the signal received over the input line 76 is derived from a bistable network 540 of the binary counting device 55 which is in its "zero" state, this signal is sufficiently positive to cause the right side of the tube 754 to conduct, while its other section is non-conductive. This places the current control network 750 in its "off" condition.

When the signal to the input line 76 is derived from a bistable circuit 540 which is in its "one" state, a sufficiently negative signal is delivered to the control electrode 752 to cause conduction to be transferred to the other section of the tube 754 placing the network 750 in its "on" condition. This allows current to flow through the input lead 790 of the signal converting network 792.

When the current control network 750 is in its "off" position, the voltage impressed across the neon bulb 776 is insufficient to ignite it and cause it to glow. However, when the circuit is switched to its "on" condition, the voltage of the non-conducting anode becomes sufficiently positive to ignite the neon bulb 778 and thereby visually indicates that the network 750 is in its "on" condition.

Although the voltage delivered to the anode 788 of the switching tube 754 may vary depending upon the number of current control circuits 750 which are in their "on" and "off" conditions, this circuit allows the current drawn through the input lines 790 to remain substantially constant. This is achieved by tube 754 with the constant current control tube 758 and its cathode resistor 760 in the path of the current flow from lead 790. This arrangement is such that the change in current with change in voltage at the anode 788 of tube 754, is inversely related to the product of the amplification factors of tubes 754 and 758. From this it is apparent that the greater the amplification factor the smaller will be the change in current with change of anode voltage. Also increasing the number of tubes in the series path of the current through lead 790 by adding additional tubes in the manner of those shown, will increase the number of amplification factors forming the product, thereby resulting in greater current stability.

Since current is constantly flowing through tubes 754 and 758 when it is either in its "on" or "off" conditions, the circuit is set for switching to its other state without heating and drift variations. Of course, the best results are obtained when the elements used are of high quality and uniformity. For example, it is especially important that the values of the cathode resistors of the several networks 750 have equal resistances for drawing equal currents from the network 792.

If the output voltage signal delivered on the output line 82 of the converter 78 is measured with respect to the positive voltage of 50 volts, a "zero" signal will be delivered when all of the current control networks 750 are in their "off" conditions. This is apparent from the fact that since no current flows in the network 792, the input line 82 remains at the positive potential level of 50 volts supplied to the network. When the network 750 which corresponds to the least significant position $2^0$ is placed in the "on" condition, a voltage drop takes place in the network 792 producing a negative signal (with respect to plus 50 volts) representing a one unit count of the binary counting device 55. When the network 750 which corresponds to the second significant position is in its "on" condition, a negative signal is produced on the output line 82 which is two times the amplitude of the signal produced by the next preceding network 750 of lesser binary significance. Thus, each succeeding network 750 produces a voltage change which is increased by a scale factor of two over its next preceding stage of lesser binary significance. The signal produced at the output line 82 is the sum of the effects produced by the circuits 750 individually. The signals delivered to the respective input lines or leads 790 of the network 792 are multiplied by their respective lead scale factors and added to produce the linearly related output signal on line 82.

The value of the terminal resistor 800 may be varied without changing the relationship of the effects of the several networks 750 on the output signal of the network 792. Thus, a succeeding network 750 will produce a signal output at the line 82 which is twice the signal produced by its preceding network 750. The increase of the value of the resistor 800 over the resistance R will increase the value of the output signal at the output line 82 without any other changes in the circuit. The increase in the output signal on the output line 82 continues as the resistance of the resistor 800 is increased until it is infinite. The change in the resistance of the resistor 800 from R to an infinite value, results in an increase or amplification of the output signal on the line 82 by a factor of three. This increase of signal output amplitude is highly important since the other known ways of achieving this are accompanied by disadvantages in the circuit design and efficiency of operation.

Thus, when digital information is delivered to the input leads 76 of the converter 78, the current control networks 750 are respectively switched to their "on" and "off" conditions in accordance with the concurrently received input signals. The resulting flow of current through the input leads 790 of the signal converting network 792 associated with networks 750, which are in their "on" condition, produces an output signal at the output line 82. The amplitude of the output signal 82 is an analogue representation or translation of the digitally received information on the input leads 76 of the converter 78.

As the information received by the input leads 76 changes so does the output signal on the line 82 of the converter 78. It is noted that the switching operation of the tubes 754 in the current control networks 750 may take place at great speed, so that the analogue information delivered at the line 82 corresponds closely with the digital information received on the input lines 76. Since the digital input information is constantly present and may be periodically altered, the output signal on the line 82 is always available and changes periodically to correspond with the input information.

The illustration of the several switching circuits 750 of converter 78 shows the set-up in FIGURE 5 of the digital signal information +01010111 which is being converted to analogue or voltage form and delivered to the output terminal 82.

It is intended that this invention be not limited to the specific embodiment illustrated and described since modifications and variations which do not depart from the essence of the invention may be made by those knowledgeable in the art of electronic circuitry. Rather, it is intended that the scope of the invention be construed in accordance with the appended claims.

What is claimed is:

1. A device for converting a digitally coded input to an analog output voltage comprising a plurality of switches corresponding to the number of bits in the digital code to be converted, a source of constant current connected to each of said switches, each switch having two sections, means normally maintaining one of said sections conductive to permit the current from said source to flow therethrough, a resistive network having a terminal resistor providing said output voltage, each of said switches in response to an input signal representing one of two binary values causing its source of constant current to flow through the other of said sections into said network, and said network having intermediate resistors arranged to cause the voltage across said terminal resistor due to current flowing through a switch having a binary significant position greater than the least significant position to be twice greater than the voltage produced by current flowing through the next preceding switch of lesser binary significance.

2. A device for converting a digitally coded input to an analog output voltage comprising a plurality of bistable elements, each of said elements corresponding to a different bit in the digital code to be converted, a current regulator connected to each bistable element for maintaining a constant current through its associated element, each of said bistable elements having connected thereto a gaseous discharge device for visually indicating the stable state in which the element then resides, means for causing each of said bistable elements to assume one or the other of its two stable states in accordance with the binary value of its corresponding bit, a resistive network, each of said bistable elements causing its current to flow into said network only when it is in one of its two stable states, and said bistable elements being connected to different points of said network whereby the current from an element having a binary significant position greater than the least significant position produces an effect upon the output voltage derived from said network twice greater than the effect caused by the current flowing out of next preceding element of lesser binary significance.

References Cited in the file of this patent

UNITED STATES PATENTS

| | | |
|---|---|---|
| 2,715,678 | Barney | Aug. 16, 1955 |
| 2,731,631 | Spaulding | Jan. 17, 1956 |
| 2,738,504 | Grey | Mar. 13, 1956 |
| 2,827,233 | Johnson et al. | Mar. 18, 1958 |
| 2,869,115 | Doeleman et al. | Jan. 13, 1959 |
| 2,892,147 | Bell | June 23, 1959 |
| 2,896,514 | Rosenburg | July 28, 1959 |
| 2,914,758 | Retzinger | Nov. 24, 1959 |
| 2,916,734 | Spencer | Dec. 8, 1959 |